United States Patent von Zelewsky et al.

[11] 4,097,484
[45] Jun. 27, 1978

[54] MIXED COMPLEXES OF METHINE DYES

[75] Inventors: Alexander von Zelewsky, Givisiez; Christoph Frey, Aesch; François L'Eplattenier, Therwil, all of Switzerland

[73] Assignee: Ciba-Geigy Corporation, Ardsley, N.Y.

[21] Appl. No.: 619,888

[22] Filed: Oct. 6, 1975

[30] Foreign Application Priority Data

Oct. 17, 1974 Switzerland .................. 13920/74

[51] Int. Cl.² ............... C07F 3/06; C07F 7/24; C07F 15/04; C07F 15/06
[52] U.S. Cl. .................. 260/299; 106/288 Q; 260/42.22; 260/37 PC; 260/38; 260/37 M; 260/40 P; 260/40 TN; 260/302 H; 260/326.1; 548/327; 548/326
[58] Field of Search .............. 260/299; 106/288 Q

[56] References Cited
U.S. PATENT DOCUMENTS 2,402,961  7/1946  Hill .................. 260/299
3,897,439  7/1975  Frey ................. 260/299

Primary Examiner—Donald G. Daus
Assistant Examiner—D. B. Springer
Attorney, Agent, or Firm—Vincent J. Cavalieri

[57] ABSTRACT

Mixed complexes of methine dyes of formula

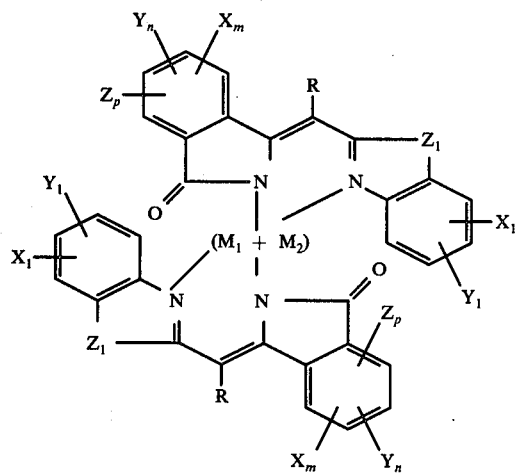

wherein $M_1$ represents zinc, cadmium, lead or manganese, $M_2$ represents cobalt, copper or nickel, R represents an organic radical, $Z_1$ represents an oxygen or a sulphur atom or an imino group, $X_1$ and $Y_1$ represent hydrogen or halogen atoms, alkyl, alkoxy, alkoxycarbonyl, alkylsulphonyl or alkylcarbamoyl groups of 1 to 6 carbon atoms, nitro, carbamoyl or arylcarbamoyl groups, or the radicals $X_1$ and $Y_1$ form a fused benzene ring, X represents a hydrogen atom, Y represents a halogen atom and Z represents a nitro group or a group of formula $R_1Y_2$—, wherein $R_1$ represents a hydrogen atom, an alkyl or cycloalkyl group of 1 to 6 carbon atoms, an aralkyl or aryl group, and $Y_2$ represents an oxygen or a sulphur atom, $m$ is 0 to 4, $n$ is 0 to 4, $p$ is 0 to 3, and the sum of $m+n+p$ must be 4, and wherein the atomic ratio of $M_1:M_2$ is between 5:95 and 95:5 which are useful for pigmenting high molecular organic material.

7 Claims, No Drawings

MIXED COMPLEXES OF METHINE DYES

Homogeneous metal complexes of 3-benzimidazolyl-methylene-isoindolinones are described in German Offenlegungsschrift No. 2,359,791. While the cobalt complexes mentioned therein are characterised by outstanding light and weather fastness properties, they effect somewhat muted reddish yellow colourations in plastics and varnishes. The zinc complexes, on the other hand, effect a brilliant, greenish yellow shade, but they are inferior to the cobalt complexes in light and weather fastness.

The present invention provides mixed complexes of methine dyes of formula

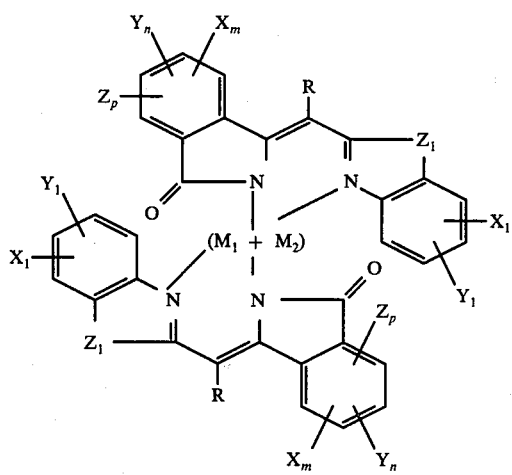

wherein $M_1$ represents zinc, cadmium, lead or manganese, $M_2$ represents cobalt, copper or nickel, R represents an organic radical, $Z_1$ represents an oxygen or a sulphur atom or an imino group, $X_1$ and $Y_1$ represent hydrogen or halogen atoms, alkyl, alkoxy, alkoxycarbonyl, alkylsulphonyl or alkylcarbamoyl groups of 1 to 6 carbon atoms, nitro, carbamoyl or arylcarbamoyl groups, or the radicals $X_1$ and $Y_1$ form a fused benzene ring, X represents a hydrogen atom, Y represents a halogen atom and Z represents a nitro group or a group of formula $R_1Y_2$—, wherein $R_1$ represents a hydrogen atom, an alkyl or cycloalkyl group of 1 to 6 carbon atoms, an aralkyl or aryl group, and $Y_2$ represents an oxygen or a sulphur atom, $m$ is 0 to 4, $n$ is 0 to 4, $p$ is 0 to 3, and the sum of $m+n+p$ must be 4, and wherein the atomic ratio of $M_1:M_2$ is between 5:95 and 95:5.

The term "aryl" in the above definition denotes for example, a naphthyl radical, but preferably a phenyl radical which may be substituted by halogen atoms, alkyl or alkoxy groups of 1 to 4 carbon atoms.

The light and weather fastness properties of the $M_1$ complexes are improved in a synergistic manner by the mixed complex formation with $M_2$ complexes. The practical utility of the otherwise brilliant and productive but non-lightfast $M_1$ complexes is thereby made more interesting.

Preferred mixed complexes are those of formula I wherein R represents a cyano group and $Z_1$ represents an imino group, and especially those of formula

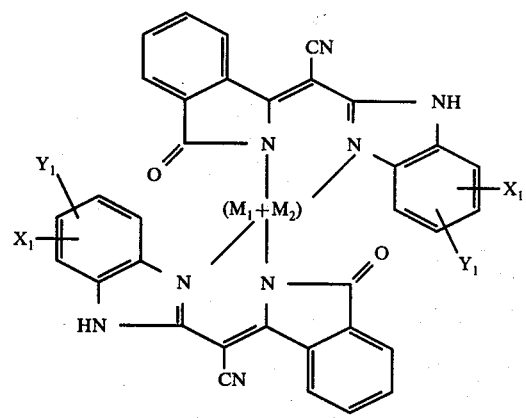

wherein $M_1$, $M_2$, $X_1$ and $Y_1$ are as defined hereinbefore.

Particularly preferred mixed complexes are those of the given formulae wherein $X_1$ and $Y_1$ represent hydrogen atoms and the atomic ratio of $M_1:M_2$ is between 10 and 90 and 90 and 10 and wherein $M_1$ represents zinc and $M_2$ represents cobalt.

The mixed complexes according to the invention are obtained by metallising an isoindolinone of formula

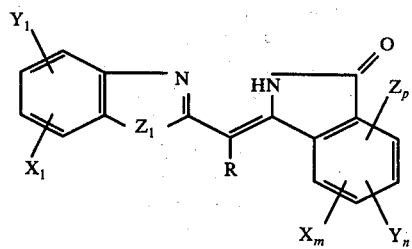

wherein R, X, Y, Z, $X_1$, $Y_1$, $Z_1$, $m$, $n$ and $p$ are as defined hereinbefore, with a mixture which consists of 5-95 molar percent of a salt of zinc, cadmium, lead or manganese and of 95-5 molar percent of a salt of cobalt, copper or nickel.

The isoindolinones used as starting materials are known compounds. They are obtained by condensing an azole of formula

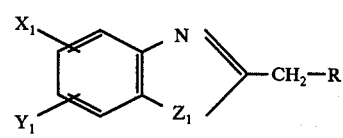

especially one of formula

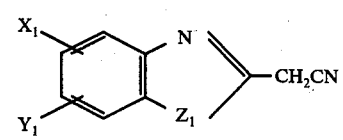

with an isoindolinone of formula

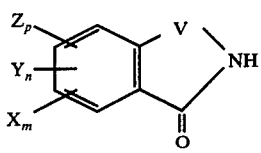

wherein R, $X_1$, $Y_1$, $Z_1$, X, Y, Z, m, n and p are as defined hereinbefore, and V represents a group of formula

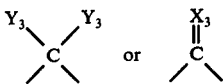

wherein $X_3$ represents an imino or a thio group and $Y_3$ represents a halogen atom, a lower alkoxy or secondary amino group.

As azoles there may be cited oxazoles, thiazoles or, in particular, imidazoles, for example:

2-cyanomethyl-benzimidazole
2-cyanomethyl-4-chloro-benzimidazole
2-cyanomethyl-5-chloro-benzimidazole
2-cyanomethyl-5,6-dichloro-benzimidazole
2-cyanomethyl-4-chloro-6-methyl-benzimidazole
2-cyanomethyl-5-methoxy-benzimidazole
2-cyanomethyl-6-ethoxy-benzimidazole
2-cyanomethyl-6-nitro-benzimidazole
2-cyanomethyl-6-cyano-benzimidazole
2-cyanomethyl-5-methylsulphonyl-benzimidazole
benzimidazolyl-2-acetamide
benzimidazolyl-2-methylacetamide
benzimidazolyl-2-phenylacetamide
benzimidazolyl-2-methyl acetate
benzimidazolyl-2-ethyl acetate
benzimidazolyl-2-phenylacetate
bis-(2-benzimidazolyl)-methane
2-cyanomethyl-benzthiazole
2-cyanomethyl-5-chloro-benzthiazole
2-cyanomethyl-6-chloro-benzthiazole
2-cyanomethyl-7-chloro-benzthiazole
2-cyanomethyl-5-methyl-benzthiazole
2-cyanomethyl-6-methyl-benzthiazole
2-cyanomethyl-5-methoxy-benzthiazole
2-cyanomethyl-6-methoxy-benzthiazole
benzthiazolyl-2-acetamide
benzthiazolyl-2-methylacetamide
benzthiazolyl-2-phenylacetamide
2-ethyl-benzimidazole
2-benzyl-benzimidazole
2-cyanomethyl-6-trifluoromethyl-benzimidazole
2-ethyl-benzthiazole
2-benzyl-benzthiazole
2-ethyl-benzoxazole
2-benzyl-benzoxazole
bis-(2-benzthiazolyl)-methane
2-cyanomethyl-benzoxazole
benzoxazolyl-2-acetamide
bis-(2-benzoxazolyl)-methane
(2-benzoxazolyl)-(2'-benzimidazolyl)-methane.

Possible isoindolinones are preferably 3-iminoisoindolinones or 3,3-dimethoxyisoindolinones or the alkali salts of 3,3-dimethoxyisoindolinones. As examples there may be cited:

3,3-dimethoxy-4,5,6,7-tetrachloro-isoindolinone-1
3-imino-5,6-dichloro-isoindolinone-1
3,3,6-trimethoxy-4,5,7-trichloro-isoindolinone-1
3-imino-4,5,7-trichloro-6-phenoxy-isoindolinone-1
3-imino-4,5,7-trichloro-6-methylmercapto-isoindolinone-1
3,3-dimethoxy-6-butoxy-4,5,7-trichloro-isoindolinone-1
3-imino-7-chloro-4-phenylmercapto-isoindolinone-1
3,3,6-trimethoxy-4,5,7-tribromo-isoindolinone-1
3,3,4,6-tetramethoxy-5,7-dichloro-isoindolinone-1
3-imino-isoindolinone (imino-phthalimide)
3,3-dimethoxy-4-nitro-isoindolinone-1
3,3-dimethoxy-6-nitro-isoindolinone-1
3,3-dimethoxy-4,6-dichloro-isoindolinone-1
3-imino-6-(phenylcarbamoyl)-isoindolinone-1
3,3-dimethoxy-4,5,6,7-tetrabromo-isoindolinone-1
3,3-dimethoxy-5,7-dichloro-4,6-diphenoxy-isoindolinone-1
3,3-dimethoxy-4,5,7-trichloro-6-(4'-chlorophenoxy)-isoindolinone-1
3-imino-4,5,6,7-tetrachloro-isoindolinone-1
3,3-dimethoxy-4,7-dichloro-isoindolinone-1
3,3-dimethoxy-4-chloro-isoindolinone-1
3,3-dimethoxy-6-iodo-isoindolinone-1
3-imino-5- or 6-phenyl-isoindolinone
3,3-dimethoxy-5,7-dichloro-4,6-dimethylmercapto-isoindolinone-1
3,3-dimethoxy-4,5,7-trichloro-6-ethoxy-isoindolinone-1
3,3-bismorpholino-4,5,6,7-tetrachloro-isoindolinone-1.

The formiates, acetates or stearates of the cited metals are used advantageously for the metallising.

It is advantageous to carry out the process at elevated temperature in an organic solvent, for example an alcohol, such as methanol, ethanol, isopropanol, glacial acetic acid or preferably ethylene glycol monoalkyl ether, diethylene glycol monoalkyl ether or dimethyl formamide. It is also possible to use a mixture of these solvents or water.

The colourants of the present invention are useful pigments which can be used in finely divided form for pigmenting organic material of high molecular weight, for example cellulose ethers and esters, such as ethyl cellulose, nitrocellulose, cellulose acetate, cellulose butyrate, natural resins or synthetic resins, for example polymerisation or condensation resins, for example aminoplasts, especially urea/formaldehyde and melamine/formaldehyde resins, alkyd resins, phenolic plastics, polycarbonates, polyolefins, for example polystyrene, polyvinyl chloride, polyethylene, polypropylene, polyacrylonitrile, polyacrylic esters, polyamides, polyurethanes or polyesters, rubber, casein, silicon and silicone resins, singly or in mixtures.

It is immaterial whether the above compounds of high molecular weight are in the form of plastics, melts or of spinning solutions, varnishes, paints or printing inks. Depending on the use for which they are intended, it is advantageous to use the pigments of the present invention as toners or in the form of preparations. It is often advantageous to subject the pigments to a grinding process to bring them into a fine state of division.

In the following Examples, the parts and percentages are by weight unless otherwise stated.

EXAMPLE 1

12.02 parts of the dye of formula

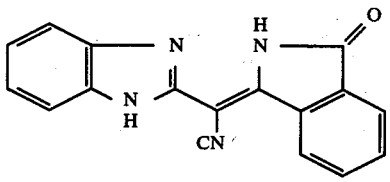

are dissolved in 100 parts of dimethyl formamide at 120°–150° C. Then a solution of 4.14 parts of zinc acetate.2H₂O and 0.524 part of cobalt acetate.4H₂O in 100 parts of dimethyl formamide is run in. The batch is heated with stirring to 140°–145° C, kept at this temperature for 5–6 hours, and then filtered. The filter cake is washed e.g. with hot o-dichlorobenzene, methanol and water, and dried at 100° C in vacuo.

Water can also be used as reaction medium instead of dimethyl formamide, in which case the temperature is kept for 10–15 hours at app. 95° C.

The complex has a mixture ratio of zinc to cobalt of 90:10. When finely dispersed, for example by grinding it in isopropanol using grinding elements, and incorporated into polyvinyl chloride in a roll mill, the complex yields a yellow sheet with substantially better light fastness than a similarly coloured sheet obtained by mixing the pure zinc and cobalt complexes by grinding them in the corresponding ratio.

The starting dye of the above formula can be obtained, for example, in accordance with DOS No. 2,359,791 by condensing iminophthalimide hydrochloride with 2-cyanomethylbenzimidazole in ethylene glycol monoethyl ether. By using the respective amounts of zinc acetate.2H₂O listed in column II of Table 1 instead of the 4.14 parts above and the respective amounts of cobalt acetate.4H₂O in column III instead of the 0.524 part above and carrying out the same procedure, there are obtained pigments with the atomic ratios (in %) of zinc to cobalt stated in columns IV and V and with better light and weather fastness properties than the mixtures obtained from the pure complexes having the same metal ratios.

Table 1

| Ex. | Parts zinc acetate . 2H₂O | Parts cobalt acetate . 4H₂O | app. % Zn | app. % Co |
|---|---|---|---|---|
| 2 | 3.68 | 1.04 | 80 | 20 |
| 3 | 3.22 | 1.56 | 70 | 30 |

Table 1-continued

| Ex. | Parts zinc acetate . 2H₂O | Parts cobalt acetate . 4H₂O | app. % Zn | app. % Co |
|---|---|---|---|---|
| 4 | 2.76 | 2.08 | 60 | 40 |
| 5 | 2.30 | 2.6 | 50 | 50 |
| 6 | 1.84 | 3.12 | 40 | 60 |
| 7 | 1.38 | 3.64 | 30 | 70 |
| 8 | 0.92 | 4.16 | 20 | 80 |
| 9 | 0.46 | 4.68 | 10 | 90 |

EXAMPLE 10

Replacement of the zinc acetate in Examples 1–9 by equivalent amounts of cadmium, lead or manganese acetate, and of the cobalt acetate by copper or nickel acetate, yields mixed complexes with similar shades which all have better light and weather fastness properties than are obtained by mixing the pure complexes together in the same ratio.

EXAMPLE 11

11.44 Parts of the dye of Example 1 are stirred for 2 hours at 90° C in 100 parts of water, 5.32 parts of sodium hydroxide solution (30%) and 0.5 part of a wetting agent (Tamol NNOK-SA). Then a solution of 3.940 parts of zinc acetate.2H₂O and 0.498 parts of cobalt acetate.4H₂O in 50 parts of water is added and the temperature is kept for 6–15 hours at app. 95° C with stirring. The batch is filtered hot and the filter cake is washed thoroughly with hot water, then with methanol and again with water and dried in vacuo at app. 100° C to yield a mixed complex which corresponds to that obtained in Example 1.

Mixed complexes with a corresponding zinc-cobalt content are obtained by the same procedure but with other zinc acetate/cobalt acetate ratios.

EXAMPLES 12–52

By substituting a dye of column I in Table 2 for that of Example 1 and metallising in accordance with Example 1 or 11 with a mixture of metal salt of column II and a metal salt of column III in the percentage atomic ratio indicated in column IV, there are obtained mixed complex pigments of the shades indicated in column V.

The light and weather fastness properties of these mixed complexes are better than those of the mixtures obtained from the pure complexes with the same metal ratios.

Table 2

| Ex. | Dye | Metal Salt (acetate) | Metal Salt (acetate) | Ratio | Shade |
|---|---|---|---|---|---|
| 12 | (structure) | Zn | Ni | 60/40 | yellow |
| 13 | " | Zn | Ni | 80/20 | yellow |
| 14 | " | Zn | Ni | 90/10 | yellow |
| 15 | " | Zn | Cu | 60/40 | greenish yellow |
| 16 | " | Zn | Cu | 80/20 | greenish yellow |
| 17 | " | Zn | Cu | 90/10 | yellow |
| 18 | " | Cd | Ni | 60/40 | yellow |
| 19 | " | Cd | Ni | 80/20 | yellow |
| 20 | " | Cd | Ni | 90/10 | yellow |
| 21 | " | Cd | Cu | 60/40 | greenish yellow |
| 22 | " | Cd | Cu | 80/20 | greenish yellow |

Table 2-continued

| Ex. | Dye | Metal Salt (acetate) | Metal Salt (acetate) | Ratio | Shade |
|---|---|---|---|---|---|
| 23 | " | Cd | Cu | 90/10 | greenish yellow |
| 24 | " | Cd | Co | 60/40 | yellow |
| 25 | " | Cd | Co | 80/20 | yellow |
| 26 | " | Cd | Co | 90/10 | yellow |
| 27 | " | Pb | Co | 60/40 | yellow |
| 28 | " | Pb | Co | 80/20 | yellow |
| 29 | " | Pb | Co | 90/10 | greenish yellow |
| 30 | " | Mn | Co | 20/80 | yellow |
| 31 | " | Mn | Co | 70/30 | greenish yellow |
| 32 | " | Mn | Co | 25/75 | yellow |
| 33 | (benzothiazole-CN-isoindolinone structure) | Zn | Co | 70/30 | yellow |
| 34 | (benzimidazole-CH3-isoindolinone structure) | Zn | Co | 60/40 | greenish yellow |
| 35 | (benzimidazole-phenyl-isoindolinone structure) | Zn | Cu | 50/50 | greenish yellow |
| 36 | (methyl-benzimidazole-CN-isoindolinone structure) | Zn | Co | 80/20 | yellow |
| 37 | (dimethyl-benzimidazole-CN-isoindolinone structure) | Zn | Co | 70/30 | yellow |
| 38 | (chloro-benzimidazole-CN-isoindolinone structure) | Zn | Ni | 80/20 | greenish yellow |
| 39 | " | Zn | Co | 80/20 | greenish yellow |
| 40 | (benzimidazole-CN-isoindolinone-COOCH3 structure) | Zn | Co | 60/40 | yellow |
| 41 | " | Zn | Co | 80/20 | yellow |
| 42 | " | Zn | Ni | 80/20 | yellow |
| 43 | " | Zn | Ni | 60/40 | yellow |

Table 2-continued

| Ex. | Dye | Metal Salt (acetate) | Metal Salt (acetate) | Ratio | Shade |
|---|---|---|---|---|---|
| 44 | [structure: dimethylbenzimidazole-CN-vinyl-isoindolinone with COOCH₃] | Zn | Co | 70/30 | yellow |
| 45 | " | Cd | Co | 70/30 | yellow |
| 46 | [structure: benzimidazole-CN-vinyl-isoindolinone with tetrabromo] | Zn | Ni | 80/20 | reddish yellow |
| 47 | " | Zn | Co | 80/20 | reddish yellow |
| 48 | [structure: benzimidazole-CN-vinyl-isoindolinone with trichloro and chlorophenoxy] | Zn | Co | 50/50 | yellow |
| 49 | [structure: benzimidazole-vinyl-isoindolinone with COOCH₃ and I] | Zn | Co | 80/20 | greenish yellow |
| 50 | " | Zn | Co | 50/50 | greenish yellow |
| 51 | " | Zn | Co | 60/40 | greenish yellow |
| 52 | [structure: bis-benzoxazole vinyl with tetrachlorophenyl isoindolinone] | Zn | Co | 80/20 | greenish yellow |

EXAMPLE 53

65 Parts of stabilised polyvinyl chloride, 35 parts of dioctyl phthalate and 0.2 part of the pigment obtained according to Example 1 are stirred together and then rolled to and fro on a two roll mill for 7 minutes at 140° C. A brilliant yellow sheet of very good fastness to light and migration is obtained.

EXAMPLE 54

10 g of titanium dioxide and 2 g of the pigment manufactured in Example 1 are ground for 48 hours in a ball mill with 88 g of a mixture of 26.4 g of coconut alkyd resin, 24 g of melamine/formaldehyde resin (50% solids content), 5.8 g of ethylene glycol monomethyl ether and 28.8 g of xylene. This varnish is sprayed onto an aluminium sheet, predried for 30 minutes at room temperature and the stoved for 30 minutes at 120° C to give a brilliant yellow finish of good colour strength which is characterised by very good fastness to overstripe bleeding, light and weather.

EXAMPLE 55 (ACRYLIC RESIN STOVING ENAMEL)

4 Parts of the finely divided pigment of Example 1 are stirred into 20 parts of a solvent of the following composition:
  50 parts of Solvesso 150(mixture of aromatic hydrocarbons)
  15 parts of butyl acetate
  5 parts of Exkin II (levelling agent based on ketoxime)
  25 parts of methyl isobutyl ketone
  5 parts of silicone oil (1% in Solvesso 150).

After complete dispersion has been attained (app. 15–60 minutes depending on the nature of the stirrer), the following binders are added:

48.3 parts of Baycryl L 530 (acrylic resin) (51% in xylene/butanol 3:1) and
23.7 parts of Maprenal TTX (melamine resin) (55% in butanol).

After it has been homogenised briefly, the varnish is applied by conventional methods, such as spraying or immersion or coil coating for the continuous coating of metal sheets, and stoved (stoving for 30 minutes at 130° C). The resultant yellow finishes are characterised by very good levelness, high gloss and excellent fine distribution of the pigment as well as by excellent weather fastness properties.

EXAMPLE 56

A non-delustred polyethylene terephthalate granulate suitable for fibre manufacture and 1% of the dye of Example 1 are shaken together in a sealable vessel for 15 minutes on a vibrator. The uniformly coloured granulate particles are spun to filaments in a melt spinning machine (285° C±3° C, retention time in the spinning machine app. 5 minutes). The filaments are stretched on a draw twister and wound onto a spool. Bright, yellow colourations are obtained which are characterised by outstanding light fastness, excellent fastness to washing, dry cleaning, cross dyeing and sublimation as well as by very good fastness to chlorite bleaching and very good fastness to rubbing after thermofixation of the coloured material.

EXAMPLE 57

In the same way as described in Example 56, a polypropylene granulate suitable for fibre manufacture is coloured with 1% of the dye of Example 1, extruded, and spun to give yellow fibres of outstanding fastness properties.

We claim:

1. Mixed complexes of methine dyes of the formula

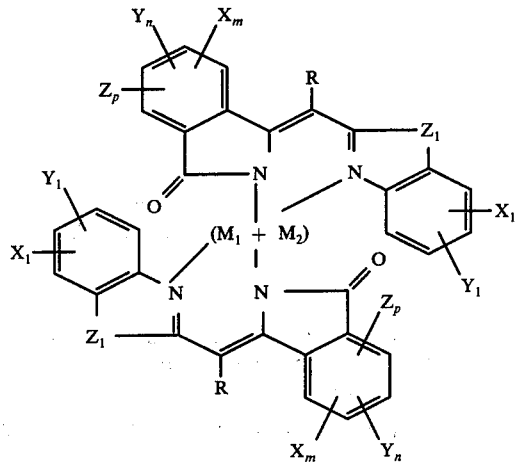

wherein $M_1$ represents zinc, cadmium, lead or manganese, $M_2$ represents cobalt, copper of nickel, R represents an organic radical selected from the group consisting of cyano, carbamoyl, methylcarbamoyl, phenylcarbamoyl, methoxycarbonyl, ethoxycarbonyl, phenoxycarbonyl, 2-benzimidazolyl, methyl, phenyl, 2-benzthiazolyl, or 2-benzoxazolyl, $Z_1$ represents an oxygen, a sulphur atom or an imino group, $X_1$ and $Y_1$ represent hydrogen, halogen atoms, alkyl, alkoxy, alkoxycarbonyl, alkylsulphonyl or alkylcarbamoyl groups of 1 to 6 carbon atoms, nitro, or carbamoyl, or the radicals $X_1$ and $Y_1$ form a fused benzene ring, X represents a hydrogen atom, Y represents a halogen atom and Z represents a nitro group or a group of the formula $R_1Y_2$—, wherein $R_1$ represents a hydrogen atom, an alkyl or cycloalkyl group of 1 to 6 carbon atoms, naphthyl, phenyl, p-chlorophenyl, and $Y_2$ represents an oxygen or a sulphur atom, $m$ is 0 to 4, $n$ is 0 to 4, $p$ is 0 to 3, and the sum of $m+n+p$ must be 4, and wherein the atomic ratio of $M_1:M_2$ is between 5:95 and 95:5 prepared by metallizing an isoindolinone of the formula

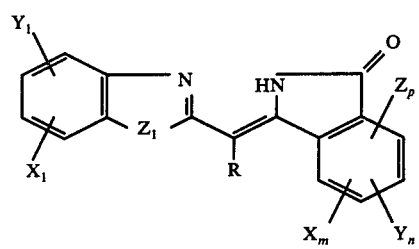

wherein R, X, Y, Z, $X_1$, $Y_1$, $Z_1$, $m$, $n$ and $p$ are as defined above, with a mixture which consists of 5–95 molar percent of a salt selected from the group consisting of a formate, acetate or stearate of zinc, cadmium, lead or manganese and of 95–5 molar percent of a salt of cobalt, copper or nickel.

2. Mixed complexes of methine dyes according to claim 1, wherein R in the given formula represents a cyano group and $Z_1$ represents an imino group.

3. Mixed complexes of methine dyes according to claim 1 of formula

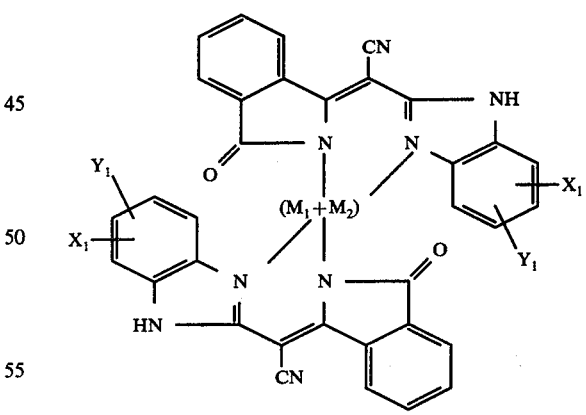

wherein $M_1$, $M_2$, $X_1$ and $Y_1$ are as defined in claim 1.

4. Mixed complexes according to claim 1, wherein $X_1$ and $Y_1$ represents hydrogen atoms.

5. Mixed complexes according to claim 1, wherein the ratio of $M_1:M_2$ is between 10–90 and 90–10.

6. Mixed complexes according to claim 1, wherein $M_1$ represents zinc and $M_2$ represents cobalt.

7. A mixed complex of methine dyes according to claim 3 of formula

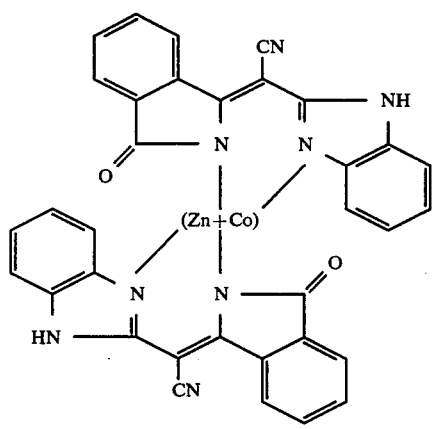
wherein Zn and Co are in the molar ratio of 50:50.
* * * * *